June 27, 1939.     A. N. HONIG     2,163,839
DEVICE FOR CONVEYING AND STRIPPING PRESS CAKES
Filed Jan. 4, 1936     8 Sheets-Sheet 1

Inventor
A. N. Honig
By C. F. Wenderoth
Attorney

June 27, 1939.  A. N. HONIG  2,163,839
DEVICE FOR CONVEYING AND STRIPPING PRESS CAKES
Filed Jan. 4, 1936  8 Sheets-Sheet 2

Inventor
A. N. Honig
By C. F. Wenderoth
Attorney

June 27, 1939. A. N. HONIG 2,163,839
DEVICE FOR CONVEYING AND STRIPPING PRESS CAKES
Filed Jan. 4, 1936 8 Sheets-Sheet 3

Inventor
A. N. Honig
By E. F. Wenderoth
Atty

June 27, 1939.    A. N. HONIG    2,163,839
DEVICE FOR CONVEYING AND STRIPPING PRESS CAKES
Filed Jan. 4, 1936    8 Sheets-Sheet 5

Inventor
A. N. Honig
By C. F. Wenderoth
Atty

Patented June 27, 1939

2,163,839

UNITED STATES PATENT OFFICE 2,163,839

DEVICE FOR CONVEYING AND STRIPPING PRESS CAKES

Adriaan Nicolaas Honig, Hilversum, Netherlands, assignor to Naamlooze Vennootschap: Oliefabrieken "Het Hart" en "De Zwaan" voorheen Adriaan Honig, Zaandam, Netherlands, a corporation of the Netherlands Application January 4, 1936, Serial No. 57,616
In the Netherlands January 8, 1935

5 Claims. (Cl. 100—52)

The invention relates to a conveyor device for conveying moulded cakes wrapped in a cloth, which is automatically stripped off during conveyance, the stripped cakes being conveyed to a device for trimming their edges.

The main purpose of the present invention is to provide a device which, if the stripping device for some reason or other should fail to operate, would prevent the non-stripped cakes from being fed to the trimming device.

The device according to the invention also either effects the removal of the non-stripped cake by means of another conveying device.

The device according to the invention comprises a conveyor comprising endless chains and pushing devices provided on the same, on which conveyor the cakes are travelling, whereas the stripping device comprises a table movable in a vertical direction on which the wrapped cakes are deposited so that they are freed from the pushing members when the table is raised. Sharp hooks or teeth are provided rotating on a horizontal transverse shaft above said table, against which teeth the cake is pressed when the table is raised, so that the cloth is seized by the said teeth and rolled up. The cake is also carried along and deposited in stripped condition upon the conveyor device at the feeding side of the stripping device. If the cloth is not seized by the teeth, the cake is not thrown to the feeding side, and will consequently be located in another spot with regard to the conveyor, and this fact is utilized according to the present invention for the purpose of preventing the non-stripped cakes from being fed to the trimming device.

According to the invention the chains on which the cakes are travelling below the rotating hooks or teeth are provided with three sets of pushing members e. g. lugs, or a multiple thereof. These are spaced apart in such a way, and the speed of said chains is so regulated with regard to that of the rotating teeth, that one set of pushing members serves to feed the cake onto the table, before said table is raised, while the next set—in case the table has been lowered carrying a cake which is not stripped on account of the cloth not having been caught by the hooks—serves for taking along said non-stripped cake and depositing the same in a spot where it will be taken over by a connecting conveyor device.

This may be accomplished e. g. by a conveyor chain provided with pushing means which grip behind a non-stripped cake arriving at the said spot and carry this cake along, whereas when a stripped cake arrives at the same spot a portion not provided with pushing means moves past this cake allowing the same to travel on. The third set of pushing means serves for taking along the stripped cakes and to convey the same to a spot where they are taken over by a connecting conveyor device and conveyed to the trimming device.

According to a special embodiment of the invention a stationary table is connected with the end of the conveyor comprising the three sets of pushing members. To this table the non-stripped cakes are carried by the second set of pushing members and the stripped cakes by the third set of the same. The stationary table is located between chains having pushing means of a second conveyor device which is located at a normal to the first conveyor. This second conveyor moves in one direction and between chains, provided with pushing means, of a third conveyor device which is moving in the opposite direction. The location of the pushing members and the rates of speed of the three conveyors are chosen so that when a stripped cake arrives on the stationary table the same is taken along by the pushing members of the conveyor device leading to the trimming device and when a non-stripped cake arrives, the same is carried off by the pushing means of the third conveyor device.

The invention is further explained with the aid of the drawings in which

Fig. 1ª is a side elevation of one end of the invention.

Fig. 1ᵇ is a side elevation of the other end.

Fig. 2ª is a plan view of the portion of the invention shown in Fig. 1ª.

Fig. 2ᵇ is a plan view of the portion of the invention shown in Fig. 1ᵇ.

One of the conveyors comprises three parts A,

B and C. The first part A of which only the end portion is illustrated chiefly comprises two parallel endless chains 1, the front part of which is passed over chain wheels 2 mounted on a shaft 3 rotatably mounted in the frame supporting the entire conveyor device and which is driven by means of a chain 4 from a second shaft 5 rotatably mounted in the frame.

This shaft 5 is driven from a shaft 7 by means of a chain 6, which shaft 7 is rotatably supported in the frame and is driven in its turn from the main shaft 80 of the machine driven by an electric motor, not shown by means of gears 81 and 82. The chains 1 are provided with lugs for carrying along the wrapped cakes, the function of which lugs will be described later on.

The portion B of the conveyor device A, B, C consists of one endless chain 10 carrying a single lug, said chain being passed over three chain wheels 11, 12 and 13 the wheel 11 of which is mounted on the shaft 5 which is driven, whereas the chain wheel 12 is freely rotatable on the shaft 3 and the third chain wheel 13 is mounted on a shaft 14 which is adjustable in the frame in a horizontal direction and by means of which the chain 10 may be tensioned.

The portion C of the conveyor A, B, C comprises two endless chains 15 provided with lugs, which chains at one end are passed over two chain wheels 16 mounted freely rotatable on the shaft 5 and at the other end over two chain wheels 17 mounted on a shaft 18 driven from the intermediate shaft 9 by means of a chain 19. This intermediate shaft 9 is driven from the shaft 7 by means of a chain 8.

Between the chains 15 of the portion C there are provided two tables 20 and 21 which are both periodically moved up and down. This vertical movement of the table 20 is obtained by means of cams 22 and 23 mounted on shafts 24 and 25, one of which 24 is actuated from the shaft 3 by means of a chain 26, whereas the other is actuated by means of gear wheels 27 and 28 which are mounted on the two shafts and are in mesh with each other. Angle irons 105 are positioned at each side of the tables 20 and 21.

The two cams 22 and 23 act upon cam rollers 29 and 30 rotatably mounted on beam 31, which on its upper side supports two rods 32 and 33, slidable in the transverse members 34 and 35 of the machine frame. The rods support at their upper ends the table 20.

Figure 12:
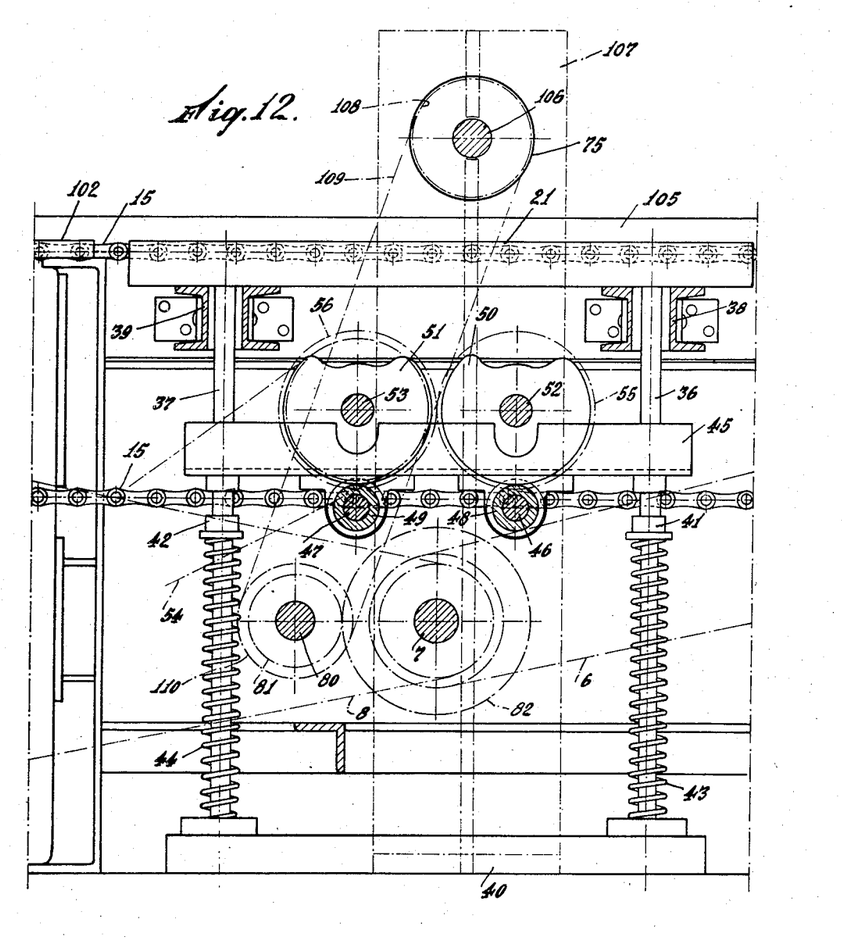
Figure 12 is a view of a portion of Figure 1 on a larger scale taken on section line XII—XII of Figure 14.
Figure 13:
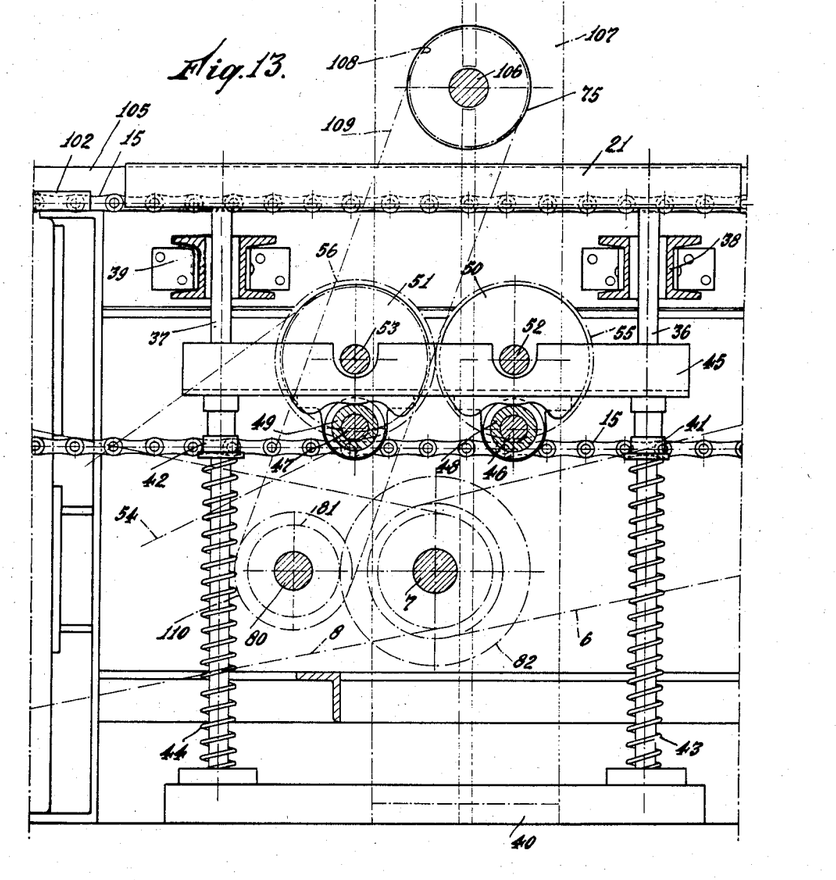
Figure 13 is a view similar to Figure 12 with the cam discs in another position.
Figure 14:
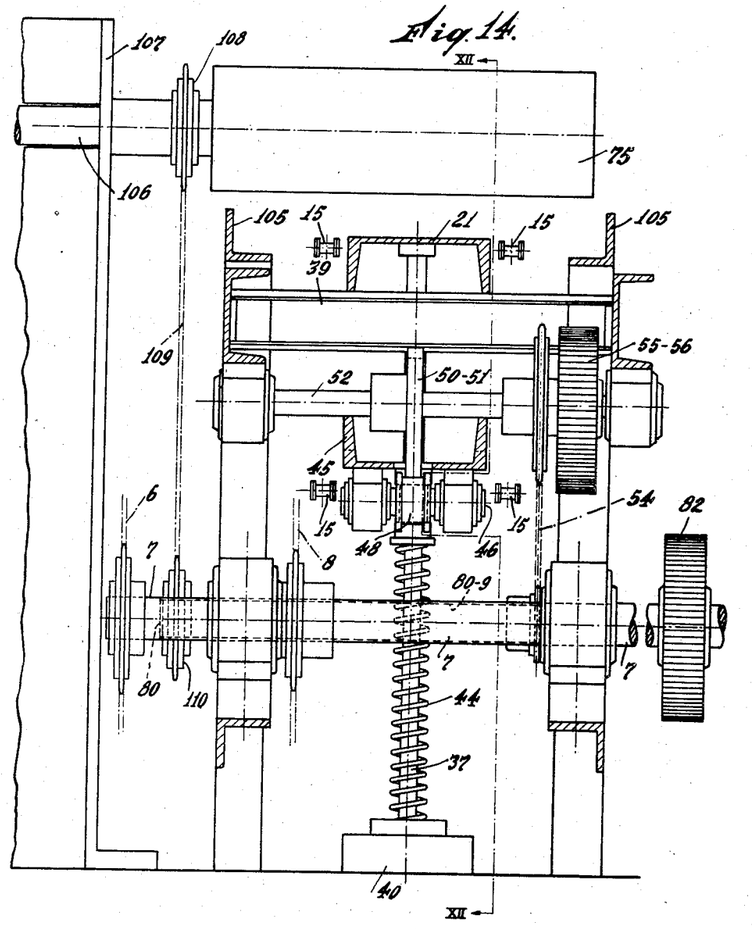
Figure 14 is a cross sectional view through the portion of the device shown in Figure 12 and taken on section line XIV—XIV of Fig. 1ª.

The table 21 is likewise carried by two rods 36 and 37 which are guided in a vertical direction in transverse members 38 and 39 of the machine frame. These rods however extend downwardly further and are guided at their lower ends by a beam 40 at the bottom of the machine. Each of these rods carries an adjustable ring 41 and 42 respectively and between said rings 41 and 42 and the beam 40 there are provided about the bars springs 43 and 44 respectively. Said springs urge the rods and the table 21 upwardly. Between the rods 36 and 37 there is provided a connecting beam 45, at the lower side of which there are located rotatable shafts 46 and 47 on which are mounted rollers 48 and 49 respectively. Through the action of the springs 43 and 44 said rollers are urged against cam disks 50 and 51 respectively, which are respectively mounted on shafts 52 and 53, rotatably mounted on the machine frame. One of said shafts 53 is driven from the intermediate shaft 9 by means of a chain 54, whereas the other one 52 is actuated by two intermeshing gear wheels 55 and 56 which wheels are similar and mounted on the said shafts. The cam disks 50 and 51 are provided with recesses shown in Figures 12, 13 and 14, but otherwise they are entirely cylindrical, so that each time the rollers 48 and 49 enter into these recesses, the table 21 is raised.

Beyond the conveyor A. B. C but connected with the portion C there is provided a stationary table 57 supported by the frame of the machine. This table is located between two endless chains 58 situated at a normal to the conveyor A, B, C. The chains are passed over chain wheels 59 freely rotatable on a shaft 60 supported in the frame of the machine at one side of the table 57 and over chain wheels 61 mounted on a shaft 62 actuated from a shaft 64 by means of a chain 63, which shaft 64 is driven from the shaft 18 by means of bevel gears 65 and 66 which are of equal size. The transverse conveying means thus formed is indicated by D.

The table 57 also lies between two other chains 67 which run parallel to the chains 58. Chains 67 pass over chain wheels 68 freely rotatable on a shaft 69 secured in the frame of the machine, and these chains lead to a trimming device (not indicated in the drawings), over driven chain wheels. The transverse conveyor thus formed has been indicated by E.

The conveyor A, B, C with the stripping device diagrammatically represented in Figs. 3–8 is operated as follows:

The chains 1 driven by means of the shaft 3 with chain wheels 2 in the direction indicated by arrows in Figs. 3–8, are provided with lugs 70, $70^1$, $70^2$ etc., spaced apart at given distances, which lugs each time will take along a cloth-wrapped cake placed on the chains at the beginning of the conveyor portion A.

Arrived at the end of this portion A the cake which is moved along by the lugs on a stationary surface provided between the chains, is carried above the chain 10 of the conveyor portion B (in which position the cake is denoted in Fig. 3 by the reference numeral $71^1$) and is taken over by a lug $72^1$ of this chain. The speed of the chain 10 is greater than that of the chains 1, so that the cake also obtains a greater speed, and as soon as the lug $72^1$ of the chain 10 has reached the cake, said cake is quickly pushed forward, thus being freed from the lugs $70^1$ of the chains 1 with which at that moment the lug $72^1$ of the chain 10 is in exact alignment.

Figure 4:
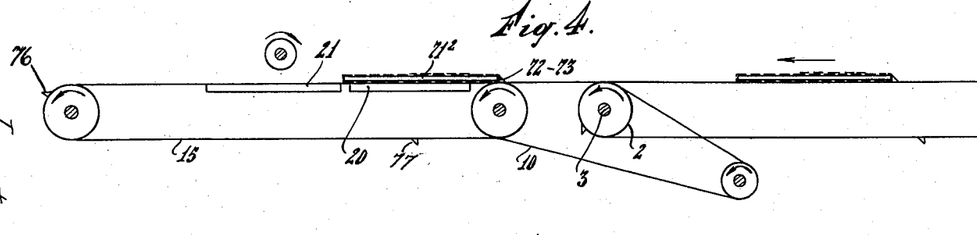

When arriving at the end of the conveyor portion B, the cake is pushed on the table 20 located between the chains 15 of the portion C. The speed of the chains 15 is greater than that of the chain 10, so that the lugs 73 of the chains 15 will take over the cake from the lug 72 of the chain 10, so that the lug becomes clear of the cake and can travel downwardly. This coinciding position of the lug 72 and the lugs 73 is illustrated in Fig. 4, the cake in that position being denoted by $71^2$.

Figure 5:
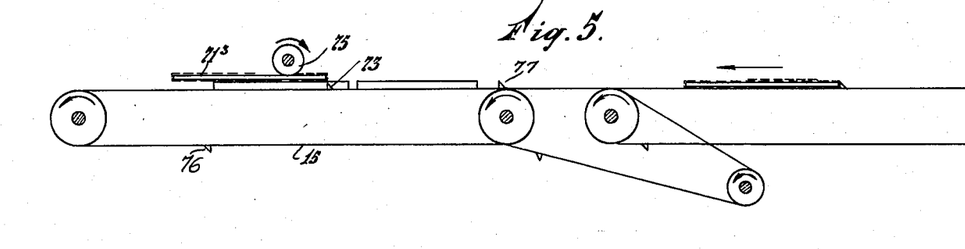
Figure 6:
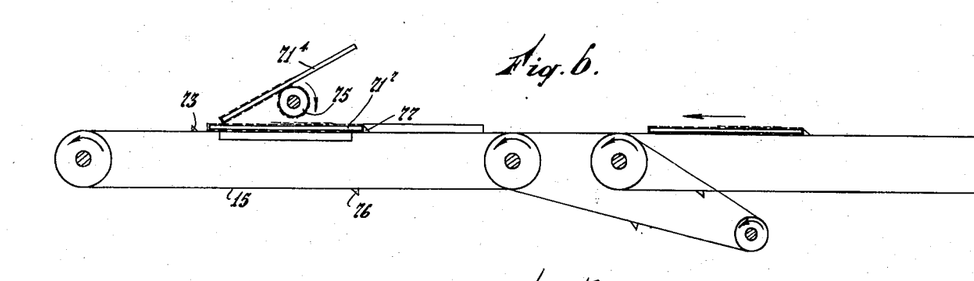
Figure 7:
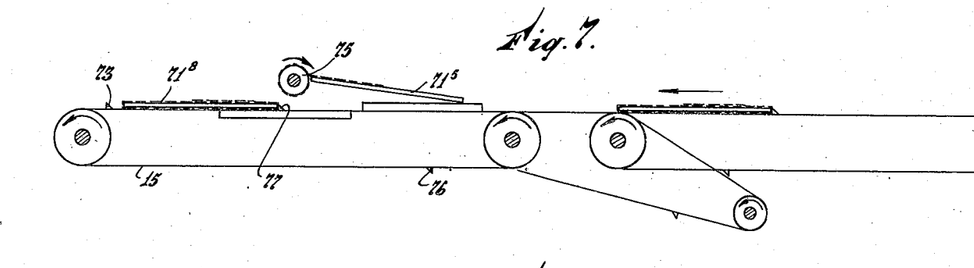
Figure 8:
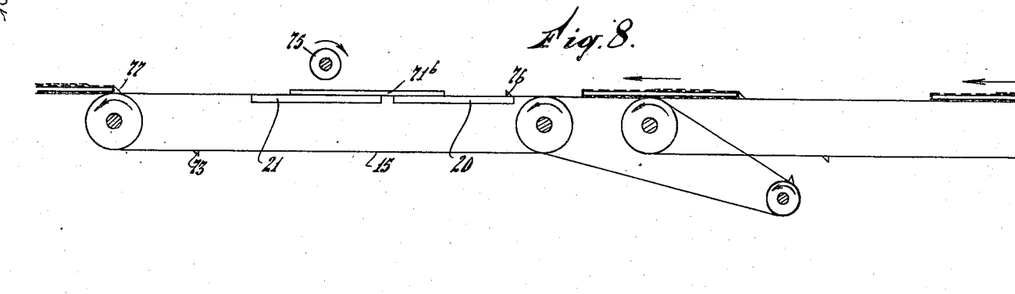

The cake is now conveyed by the lugs 73 and pushed upon the table 21 which is then raised, so that the cake will take the position indicated by $71^3$ in Fig. 5. As the table is raised by the springs 43 and 44 the cake—in spite of differences in thickness—is pushed with the upper edge of its cloth wrapper against a cylinder 75 rotating at a comparatively high rate of speed and provided with sharp pins or teeth which seize the cloth, wrapping the same around the cylinder. The cake then occupies the position denoted by 71⁴ in Fig. 6.

The cylinder 75 is arranged rotatably on a shaft 106 mounted in the vertical I-beam 107 secured to the floor. A chain wheel 108 is rigidly connected to the cylinder 75 and is driven by the chain 109 from the chain wheel 110 on the shaft 80. See Figures 13 and 14.

During the continued rotation the cake is carried over the surface of the cylinder as the cloth is further stripped off, until the said cake will finally fall off again at the feeding side of the cylinder (vide Fig. 7, in which the cake is denoted by 71⁵) and be deposited on the table 20 which at that moment occupies its highest position, thus reducing the height of the fall of the cake. The tables 20 and 21 are lowered and the stripped cake lies in the position denoted by 71⁶ in Fig. 8. The cake is then further propelled by a second set of lugs 76.

The cloth wrapped around the cylinder may be removed therefrom by any desired means. For example, in the manner shown in the Netherlands Patent No. 37,882 to Dugois and Co., dated March 17, 1936.

Figure 1:
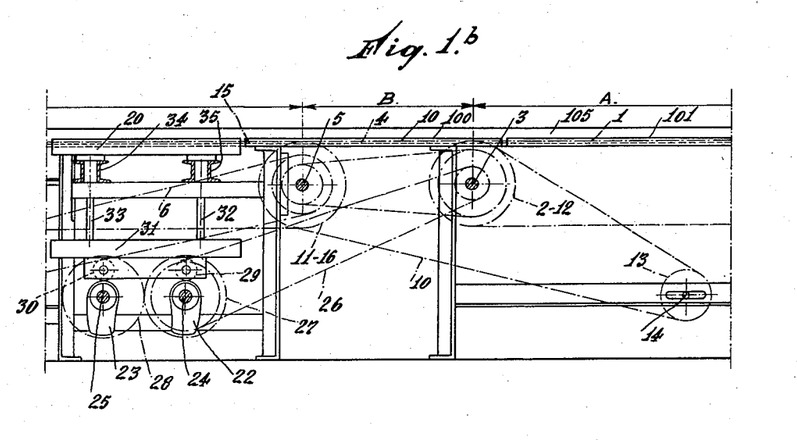
Figure 1A:
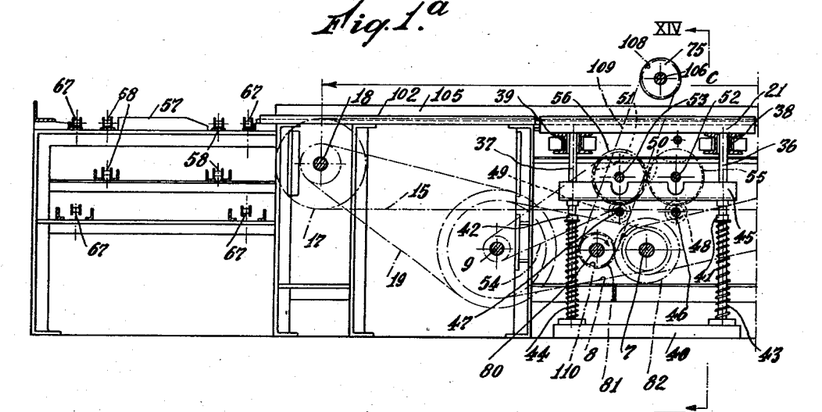
Figure 2:
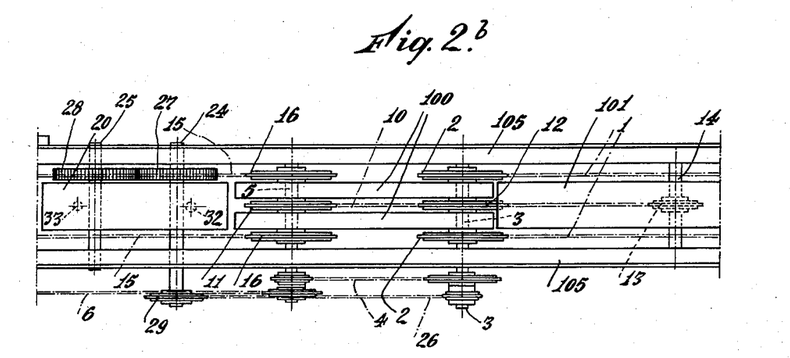
Figure 2A:
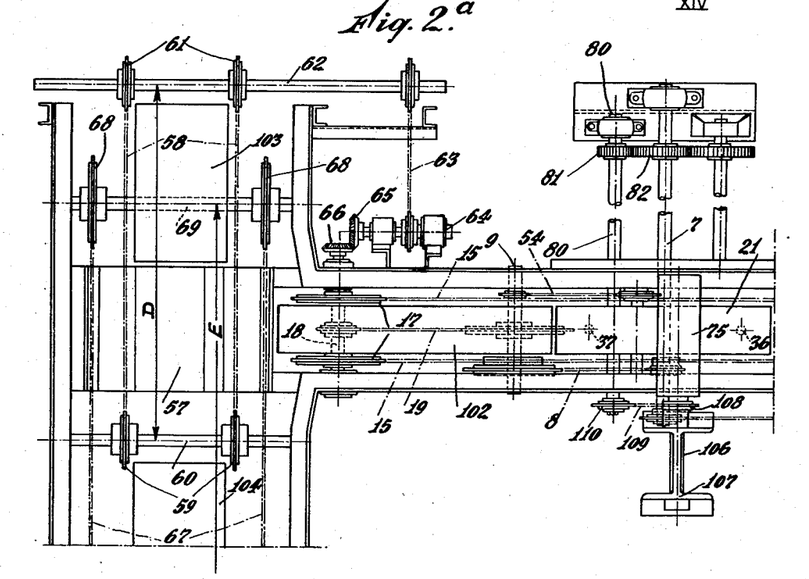
Figure 3:
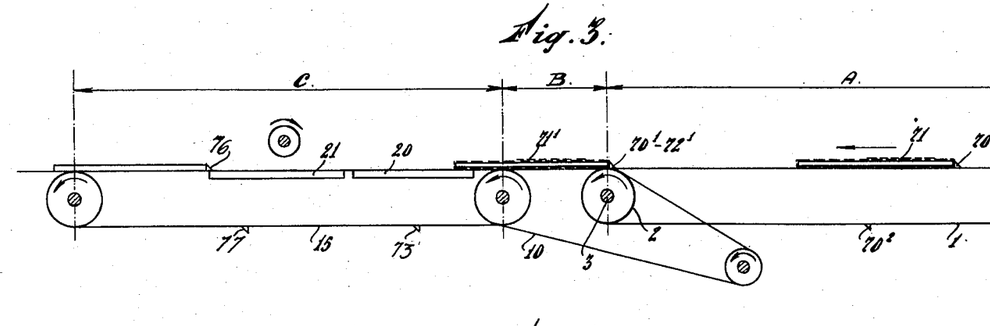
Figs. 3–8 are diagrammatic views representing the operation of the conveying device with the stripping device.

The cakes rest on flat surfaces so as to be free from the links of the chains. These flat surfaces are shown in Figures 1ª, 1ᵇ, 2ª and 2ᵇ at 100, 101, 102, 103 and 104.

It may occur that the cloth is not seized by the pins and the cake is lowered on the table 21 while still wrapped in its cloth. For further conveyance of this nonstripped cake there is provided a third set of lugs 77 between the lugs 73 and 76. At the moment that the nonstripped cake is lowered with the table 21, (the position indicated in Fig. 6 by 71⁷), the said lugs 77 will arrive behind the cake, taking the same along with them. A subsequent position is denoted by 71⁸ in Fig. 7.

The fact that the stripped cakes are removed from the chains 15 of the conveyor device A, B, C at different points than the non-stripped cakes, is utilized for discharging the stripped and the non-stripped cakes each by a different transverse conveyor, i. e. the stripped cakes are carried to the trimming device where the rough edges are trimmed off, and the non-stripped cakes to a place where they are caught and stripped or collected by hand.

Figure 9:
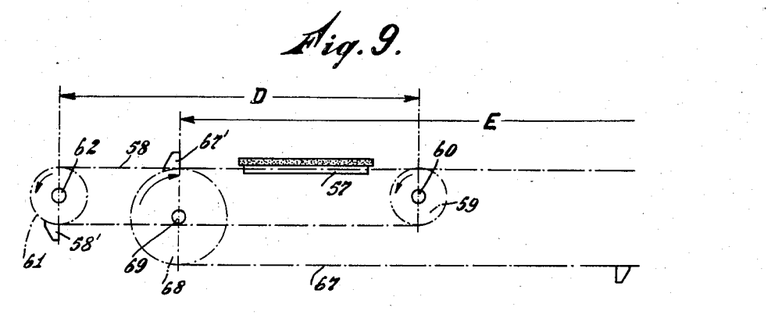
Fig. 9 diagrammatically shows the conveyors for moving in opposite directions the stripped and the non-stripped cakes.
Figure 10:
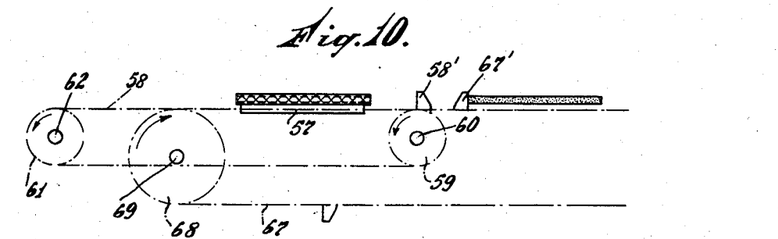
Figs. 10 and 11 show the same parts with the conveyor chains in different positions.

To this purpose the conveyors D and E (Fig. 2ª) having the lug chains 67 and 58, are used. The operation of these conveyors is explained by the diagrammatical representation of Figs. 9–11.

On the chains 67 of the conveyor E, lugs 67′ are arranged so that a cake lying on the table 57 may be carried to the right towards the cutting or trimming device. The spaced distance of the lugs 67′ is so chosen, that at a given speed of the chains 67 every time a stripped cake is pushed on the table 57 (Fig. 9) by the lugs 76 (Figs. 3–8) of the conveyor C, or a successive unstripped cake (Fig. 12) a set of lugs 67′ arrives at the table and carries the cake away. The spaced distance of the lugs 67′ is therefore of such a length that the chains 67 and therefore also the lugs 67′ cover this distance in the same time in which the conveyor chains 15 of the conveyor C go around once.

Figure 11:
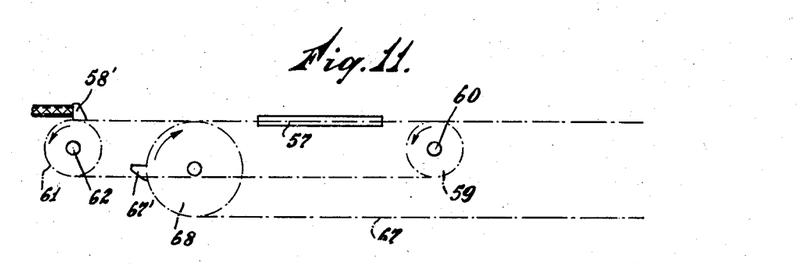

The chains 58 of the conveyor D for removing the nonstripped cakes are provided with lugs 58′ by which a non-stripped cake pushed on the table 57 (Fig. 10) may be removed to the left, that is, opposite to the movement of the stripped cakes (Fig. 11). The chains 58 have only one set of lugs 58′ and the speed of the chains is such that every time a nonstripped cake is pushed by the lugs 77 of the conveyor C on the table, the set of lugs 58′ arrives at the right hand part of the table and removes the cake from the table to the left.

The conveyor E will carry the cakes to the trimming device and the conveyor D will carry the non-stripped cakes to the place provided for them.

I claim:

1. A conveyor and stripper device for wrapped cakes obtained by pressing oil-bearing seeds comprising endless chains, pushing members on said chains for conveying said cakes, a table movable in a vertical direction for receiving said wrapped cakes, means for moving said table in timed relation to said pushing members, stripping means located above said table against which a cake resting on said table may be pressed by an upward movement of said table so that the cloth about said cake may be removed by said stripping means, said chains by which the cakes are moved to below said stripping means being provided with pushing means spaced at certain distances from said pushing members so that the rate of speed of said chains with regard to said stripping means is in timed relation so that said pushing means will convey the cake onto said table before the same is raised while in case the table has been lowered carrying a cake that is not stripped said pushing means will remove said non-stripped cake.

2. A conveyor and stripper device for wrapped cakes obtained by pressing oil-bearing seeds comprising endless chains having pushing members whereby the cakes are conveyed, a table movable in a vertical direction adapted to receive a wrapped cake, means for moving said table in timed relation to said pushing members, stripping means rotating above said table against which said cake is pressed by an upward movement of said table so that the cloth about said cake is removed by said stripping means, pushing means on said chains, said pushing means being spaced at certain distances from said pushing members so that the rate of speed of said chains with regard to said stripping means is in timed relation so that said pushing members will convey the cake to said table before the table is raised and in case said table has been lowered with a cake which is not stripped, said pushing means will remove said non-stripped cake from said table.

3. A conveyor and stripper as set forth in claim 2 in which a stationary table is provided to which the non-stripped cakes and the stripped cakes are conveyed, lug bearing chains forming a second conveyor device located at a normal to said first mentioned chains, said stationary table being located between said lug bearing chains of said second conveyor and a third set of endless chains constituting a third conveyor provided with pushing means between which said stationary table is also located, said last-named conveyor moving oppositely to said second conveyor, the location of the pushing members and the rates of speed of the three conveyors being so chosen that when a stripped cake arrives on said stationary table the same is removed to a trimming device and when a non-stripped cake arrives on said stationary table such non-stripped cake will be removed by the lugs upon said third conveyor.

4. A conveyor and stripper device for wrapped cakes secured from pressing oil-bearing seeds comprising endless chains having pushing members thereon for conveying said cakes, a table vertically reciprocal for receiving said cakes and on which a wrapped cake will be moved so as to clear said pushing members, means for moving said table in timed relation to said pushing members, stripping means rotating above said table against which said cake is pressed by raising said table so that the wrapper thereon is seized by said stripping means and said cake in its stripped condition is deposited again on said conveyor at the feeding side of said stripping means, said chains by which the cakes are moved to below the stripping means being provided with said pushing members spaced apart at such distances and being in timed relation to said stripping means so that said pushing members will serve for conveying said cake onto said table before the same is raised, and in case the table has been lowered carrying a cake that is not stripped, will serve for taking along said non-stripped cake and said pushing members carrying along the stripped cakes and conveying the same to a connecting conveyor device by which they are moved to a trimming device.

5. A conveyor and stripper device for wrapped cakes secured from pressing oil-bearing seeds comprising endless chains having pushing members thereon whereby said cakes are conveyed, a table vertically reciprocal on which a wrapped cake will be conveyed so as to clear said pushing members, means for moving said table in timed relation to said pushing members, stripping means rotating above said table against which said cake is pressed by raising said table so that the wrapper thereon is seized by said stripping means and said cake in its stripped condition is deposited again on said conveyor at the feeding side of said stripping means, said chains by which the cakes are moved to below the stripping means being provided with a plurality of sets of said pushing members spaced apart at such distances and being moved in timed relation to said stripping means so that one set of said pushing members will serve for conveying said cake onto said table before the same is raised, while a second set, in case the table has been lowered, carrying a cake that is not stripped, serves for taking along said non-stripped cake and a third set of pushing members carrying along the stripped cakes and conveying the same to a connecting conveyor device by which they are conveyed to a trimming device.

ADRIAAN NICOLAAS HONIG.